(12) United States Patent
Zhao et al.

(10) Patent No.: US 7,764,443 B2
(45) Date of Patent: Jul. 27, 2010

(54) IMAGING LENS SYSTEM AND IMAGING MODULE HAVING SAME

(75) Inventors: Yuan Zhao, Guangdong (CN); Yang-Cheng Luo, Guangdong (CN)

(73) Assignees: Premier Image Technology (China) Ltd., Foshan, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/430,060

(22) Filed: Apr. 24, 2009

(65) Prior Publication Data

US 2010/0149664 A1   Jun. 17, 2010

(30) Foreign Application Priority Data

Dec. 16, 2008   (CN) .................. 2008 10 306295

(51) Int. Cl.
G02B 9/34   (2006.01)
(52) U.S. Cl. .................. 359/773; 359/754; 359/771
(58) Field of Classification Search ......... 359/754–757, 359/763, 764, 766, 771, 773
See application file for complete search history.

(56) References Cited

U.S. PATENT DOCUMENTS

| 4,451,125 | A | * | 5/1984 | Sato ................. 359/766 |
| 4,738,496 | A | * | 4/1988 | Canzek ............. 359/357 |
| 4,810,074 | A | * | 3/1989 | Kudo et al. ........ 359/715 |
| 4,830,473 | A | * | 5/1989 | Kudo ................ 359/675 |

* cited by examiner

Primary Examiner—Darryl J Collins
(74) Attorney, Agent, or Firm—Zhigang Ma (57) ABSTRACT

An imaging module includes an imaging lens system and an image sensor. The imaging lens system includes a first lens, a second lens, a third lens, and a fourth lens. The imaging module satisfies the formulas, $2.4 < F1/TTL < 3.0$, $-7.0 < F2/TTL < -5.5$, $0.95 < F3/TTL < 2.0$, and $-3.5 < F4/TTL < -2.5$, wherein the TTL is the distance from the object surface of the first lens to the sensing surface of the image sensor on the optical axis of the imaging lens system, the F1 is the focal length of the first lens, the F2 is the focal length of the second lens, the F3 is the focal length of the third lens, and the F4 is the focal length of the fourth lens.

17 Claims, 7 Drawing Sheets

IMAGING LENS SYSTEM AND IMAGING MODULE HAVING SAME

BACKGROUND

1. Technical Field

The disclosure relates to imaging lenses and, particularly, to an imaging lens system providing a high resolution and a reduced overall length and an imaging module having the same.

2. Description of Related Art

To optimize resolution and reduce size, imaging modules for use in thin devices, such as mobile phones or personal digital assistant (PDA), must employ an imaging lens system with a high resolution and a small overall length (the distance between the object-side surface of the imaging lens system and the image plane of the imaging module). However, in optical design of an imaging lens system, increasing resolution thereof commonly increases overall lens thereof.

Therefore, it is desirable to provide an imaging lens system and an imaging module using the system which can overcome the described limitations.

DETAILED DESCRIPTION

Embodiments of the present imaging module and imaging lens system will now be described in detail with reference to the drawings.

Figure 1:
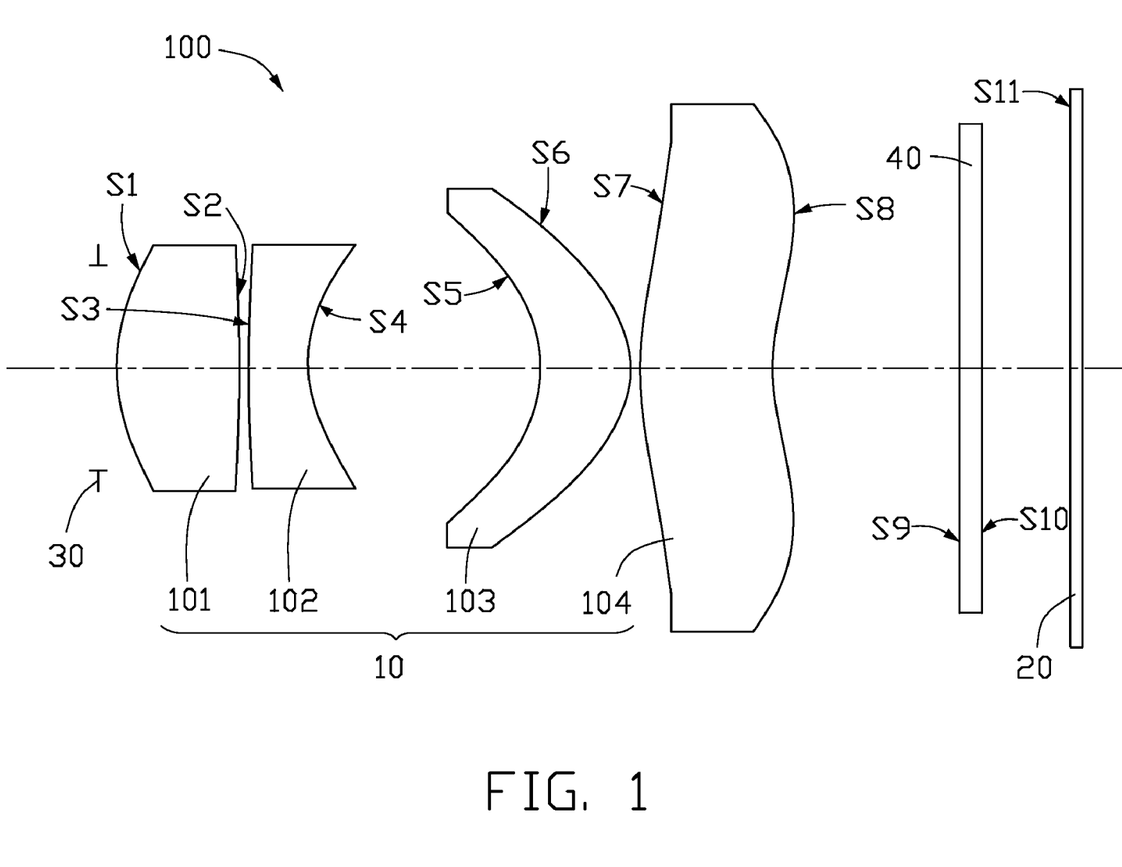
FIG. 1 is a schematic view of an imaging module in accordance with an exemplary embodiment.

Referring to FIG. 1, the imaging module 100, according to an exemplary embodiment, is shown. The imaging module 100 includes an imaging lens system 10 and an image sensor 20. The imaging lens system 10 includes, in the order from the object side to the image side thereof, a first lens 101, a second lens 102, a third lens 103, and a fourth lens 104. The first lens 101 and the third lens 103 provide positive refraction power. The image sensor 20 is aligned with the imaging lens system 10 and placed at the image side of the imaging lens system 10. The second lens 102 and the fourth lens 104 provide negative refraction power. The image sensor 20 includes a sensing surface S11 facing the imaging lens system 10.

The first lens 101 includes a convex first surface S1 facing the object side of the image lens system 10, and a convex second surface S2 facing the image side of the image lens system 10. The first and second surfaces S1, S2 are spherical.

The second lens 102 includes a convex third surface S3 facing the object side of the image lens system 10, and a concave fourth surface S4 facing the image side of the image lens system 10, thereby defining a meniscus shape of the second lens 102. The third and fourth surfaces S3, S4 are aspherical.

The third lens 103 includes a concave fifth surface S5 facing the object side of the image lens system 10, and a convex sixth surface S6 facing the image side of the image lens system 10, thereby defining a meniscus shape of the third lens 103. The fifth and sixth surfaces S5, S6 are aspherical.

The fourth lens 104 includes a convex seventh surface S7 facing the object side of the image lens system 10, and a concave eighth surface S8 facing the image side of the image lens system 10, thereby defining a meniscus shape of the fourth lens 104. The seventh and eighth surfaces S7, S8 are aspherical.

In order to obtain an imaging module 100 that has a high resolution and a reduced overall length, the imaging module 100 satisfies the formulas:

$$2.4 < F1/TTL < 3.0, \tag{1}$$

$$-7.0 < F2/TTL < -5.5, \tag{2}$$

$$0.95 < F3/TTL < 2.0, \text{ and} \tag{3}$$

$$-3.5 < F4/TTL < -2.5, \tag{4}$$

where TTL is the distance from the first surface S1 to the sensing surface S11 on the optical axis of the imaging lens system 10, F1 is the focal length of the first lens 101, F2 is the focal length of the second lens 102, F3 is the focal length of the third lens 103, and the F4 is the focal length of the fourth lens 104.

Formulas (1)-(4) are for reducing overall length of the imaging module 100.

The imaging module 100 further satisfies the formula: (5) $-0.5 < R2/R1 < 0.5$, where R1 is the radius of curvature of the first surface S1, R2 is the radius of curvature of the second surface S2. Formula (5) is for correcting the distortion of the imaging module 100, and increasing the refractive power of the first lens 101.

The imaging module 100 further satisfies the formulas: (6) $1.7 < EFL/F1 < 2.0$, (7) $-1.85 < EFL/F2 < -1.5$, (8) $1.7 < EFL/F3 < 2.0$, and (9) $-0.4 < EFL/F4 < -0.2$, where EFL is the effective focal length of the imaging lens system 10. Formulas (6)-(9) are for correcting the aberration (i.e., spherical aberration, field curvature, and distortion) of the imaging module 100.

The imaging module 100 further satisfies the formulas: (10) $1.6 < Nd2 < 1.8$, and (11) $Vd2 < 30$, where Nd2 is the index of refraction of the second lens 102, Vd2 is the Abbe number of the second lens 102. Formulas (10)-(11) are for correcting the chromatic aberration of the imaging module 100.

The imaging module 100 further satisfies the formula: (12) $T2 < 2.5$ mm, where T2 is the distance from the fourth surface S4 to the fifth surface S5 on the optical axis of the imaging lens system 10. Formula (12) is for reducing overall length of the imaging module 100.

The imaging module 100 further includes an aperture stop 30. The aperture stop 30 is positioned at the object side of the first lens 101 and is configured to prevent too much off-axis light rays entering the first lens 101. Also, positioning the aperture stop 30 at the object side of the first lens 101 is beneficial for reducing the overall length of the imaging module 100.

The imaging module 100 also includes a cover glass 40, which is positioned between the image lens system 10 and the image sensor 20 for protecting the sensing area (not labeled) of the image sensor 20. The cover glass 40 includes an object side surface S9 and an image surface S10.

The first lens 101 is made of glass, convenient for correcting the imaging aberration and increasing the resolution of the imaging module 100. The second lens 102, the third lens 103, and fourth lenses 104 can be made of plasticm to reduce cost, and all have two aspherical surfaces (i.e., the aspherical object-side surface and the aspherical image-side surface) to efficiently correct aberrations. The aspherical surface is shaped according to the formula:

$$x = \frac{ch^2}{1+\sqrt{1-(k+1)c^2 h^2}} + \sum A_i h^i,$$

where h is a height from the optical axis of the imaging module 100 to the aspherical surface, c is a vertex curvature, k is a conic constant, and Ai are i-th order correction coefficients of the aspherical surfaces.

Detailed examples of the imaging module 100 are given below in company with FIGS. 2-7, but it should be noted that the imaging module 100 is not limited by these examples. Listed below are the symbols used in these detailed examples:

TTL: distance from the first surface to the sensing surface on the optical axis of the imaging module;
EFL: effective focal length of the imaging module;
R: radius of curvature;
D: distance between surfaces on the optical axis of the lens;
Nd: refractive index of lens; and
Vd: Abbe constant.

When capturing an image, incident light enters the imaging lens system 10, sequentially transmits through four lenses 101, 102, 103, 104, the cover glass 40, and is finally focused onto the image sensor 20.

Example 1

Tables 1, 2 show the lens data of Example 1, wherein TTL=10.1 mm, EFL=7.8 mm.

TABLE 1

| surface | R (mm)   | D (mm)  | Nd      | Vd     |
|---------|----------|---------|---------|--------|
| S1      | 3.377806 | 0.88898 | 1.82706 | 26.269 |
| S2      | −61.5578 | 0.25245 | —       | —      |
| S3      | 28.67258 | 0.60    | 1.632000| 23.42  |
| S4      | 2.905263 | 2.47988 | —       | —      |
| S5      | −2.45435 | 0.96149 | 1.53047 | 55.34  |
| S6      | −1.81897 | 0.1     | —       | —      |
| S7      | 5.552553 | 1.25    | 1.53047 | 55.34  |
| S8      | 3.777145 | 2.68    | —       | —      |

TABLE 2

| Surface | Aspherical coefficient |
|---------|------------------------|
| S3 | k = 0; A4 = 0; A6 = −0.00765; A8 = 0.00364; A10 = −0.00185; A12 = 0.00062 |
| S4 | k = 0; A4 = 0; A6 = −0.00390; A8 = 0.00387; A10 = -0.00133; A12 = 0.00050 |
| S5 | k = 0.18103; A4 = −0.01161; A6 = −0.00126; A8 = −0.00139; A10 = 0.00083; A12 = 0.00009 |
| S6 | k = −0.50059; A4 = 0.00354; A6 = 0.00171; A8 = −0.00039; A10 = −0.00073; A12 = 0.00013 |
| S7 | k = −22.1089; A4 = 0; A6 = 0.00744; A8 = 0.00139; A10 = −0.00013; A12 = 0.0000042 |
| S8 | k = −11.2325; A4 = 0; A6 = −0.01595; A8 = 0.00140; A10 = −0.00008; A12 = 0.0000016 |

Figure 2:
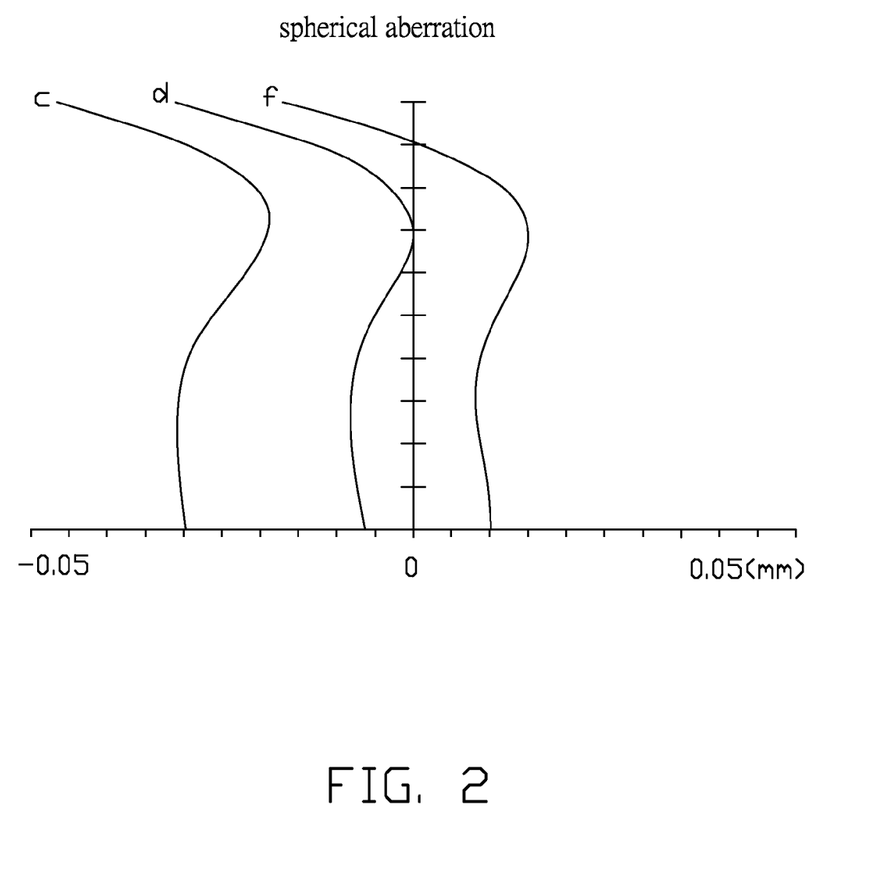
FIG. 2 is a spherical aberration graph of the imaging module of FIG. 1, according to a first exemplary embodiment.
Figure 3:
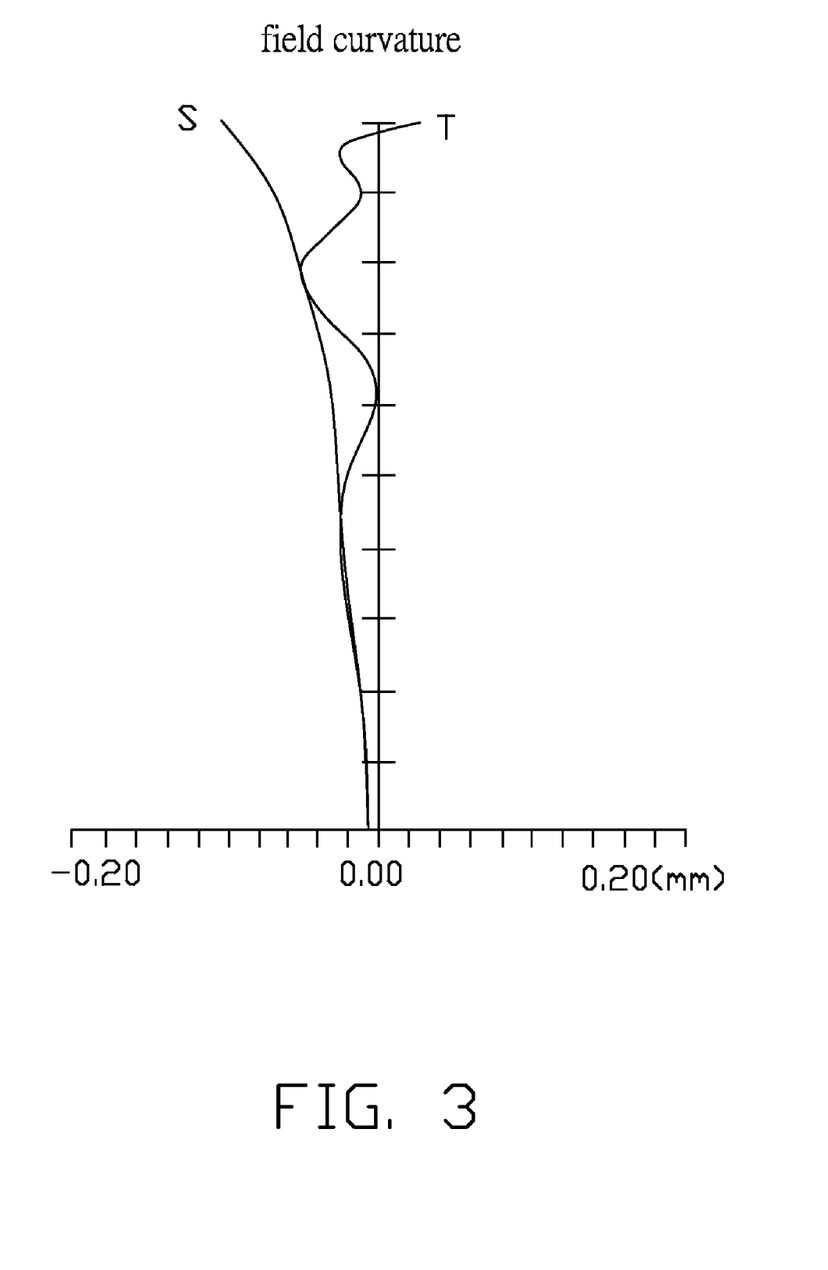
FIG. 3 is a field curvature graph of the imaging module of FIG. 1, according to the first exemplary embodiment.
Figure 4:
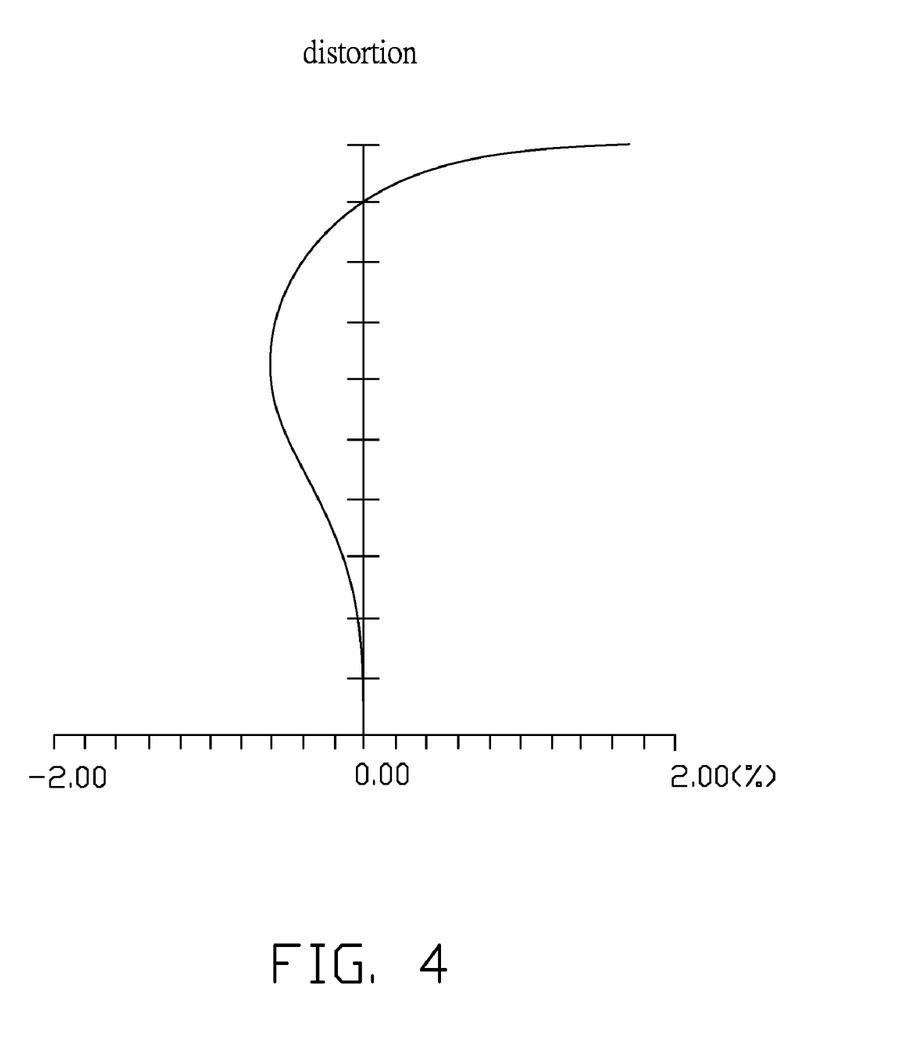
FIG. 4 is a distortion graph of the imaging module of FIG. 1, according to the first exemplary embodiment.

The spherical aberration graph, the field curvature graph, and the distortion graph of the image module 100 of Example 1 are respectively shown in FIGS. 2~4. Spherical aberrations of line f (λ=486 nm) and line d (λ=587 nm) and line c (λ=656 nm) are shown in FIG. 2. Generally, spherical aberration of visible light (with a wavelength between 400~700 nm) of the image module 100 in the Example 1 is within a range of −0.05 mm to 0.05 mm. The sagittal field curvature and tangential field curvature shown in FIG. 3 are kept within a range of −0.20 mm to 0.20 mm. The distortion in FIG. 4 falls within a range of −2% to 2%. Obviously, the spherical aberration, field curvature, and distortion are well controlled in the Example 1 of the image module 100.

Example 2

Tables 3, 4 show the lens data of EXAMPLE 2, wherein TTL=10.4 mm, EFL=7.7 mm.

TABLE 3

| surface | R (mm)    | D (mm) | Nd       | Vd        |
|---------|-----------|--------|----------|-----------|
| S1      | 3.887667  | 1.67   | 1.827057 | 26.269    |
| S2      | −9.231208 | 0.13   | —        | —         |
| S3      | −7.499959 | 0.60   | 1.607265 | 26.640    |
| S4      | 4.226031  | 2.37   | —        | —         |
| S5      | −2.454353 | 0.91   | 1.531131 | 55.753900 |
| S6      | −1.818973 | 0.1    | —        | —         |
| S7      | 5.552553  | 1.37   | 1.531131 | 55.753900 |
| S8      | 3.53099   | 2.42   | —        | —         |

TABLE 4

| Surface | Aspherical coefficient |
|---|---|
| S3 | k = 0; A4 = 0; A6 = 0.00020; A8 = −0.00107; A10 = 0.00131; A12 = −0.00045 |
| S4 | k = 0; A4 = 0; A6 = 0.00078; A8 = 0.00294; A10 = −0.00135; A12 = 0.00056 |
| S5 | k = 0.18103; A4 = −0.00582; A6 = 0.00316; A8 = −0.00766; A10 = 0.00114; A12 = 0.00028 |
| S6 | k = −0.50059; A4 = −0.00446; A6 = 0.00710; A8 = −00005; A10 = −0.00078; A12 = 0.00024 |
| S7 | k = −24.0474; A4 = 0; A6 = −0.00321; A8 = 0.00113; A10 = −0.00011; A12 = 0.000003 |
| S8 | k = −11.2325; A4 = 0; A6 = −0.01242; A8 = 0.00119; A10 = −0.00005; A12 = 0.0000007 |

Figure 5:
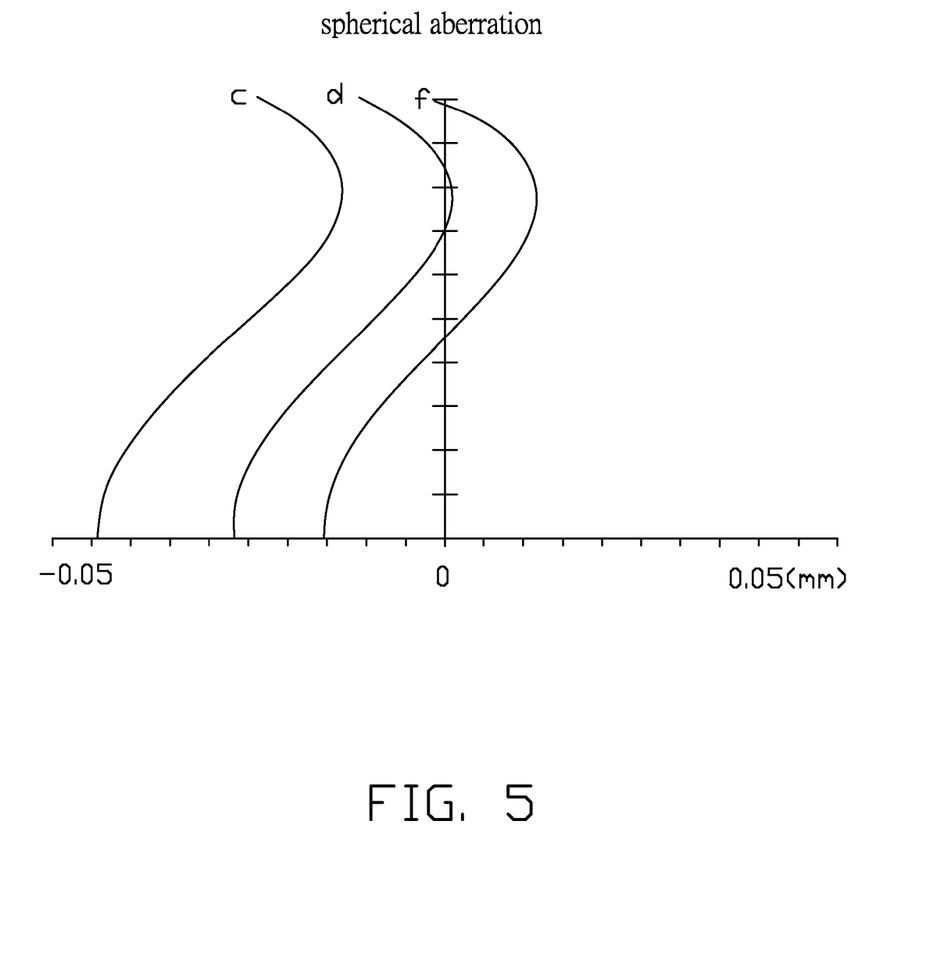
FIG. 5 is a spherical aberration graph of the imaging module of FIG. 1, according to a second exemplary embodiment.
Figure 6:
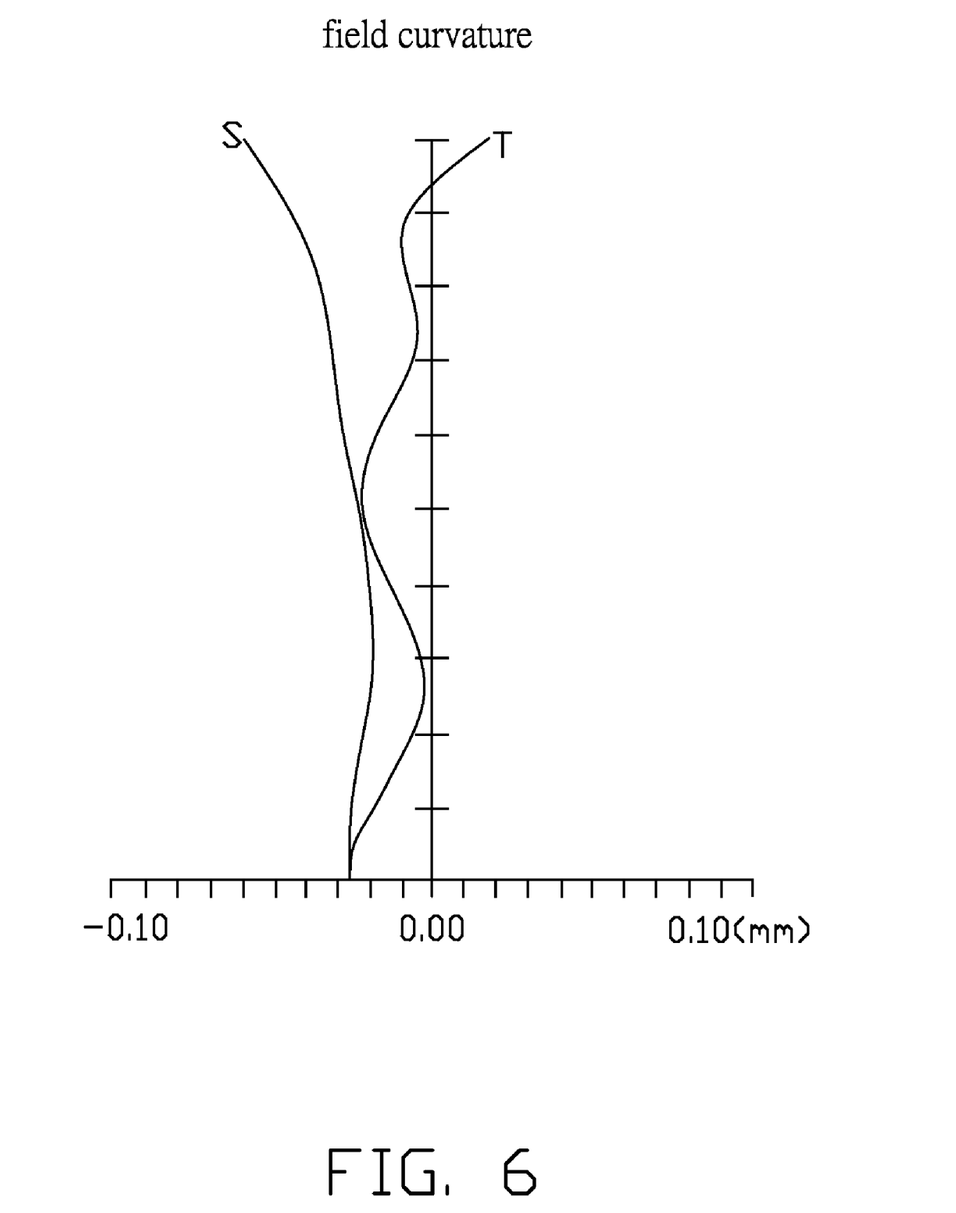
FIG. 6 is a field curvature graph of the imaging module of FIG. 1, according to the second exemplary embodiment.
Figure 7:
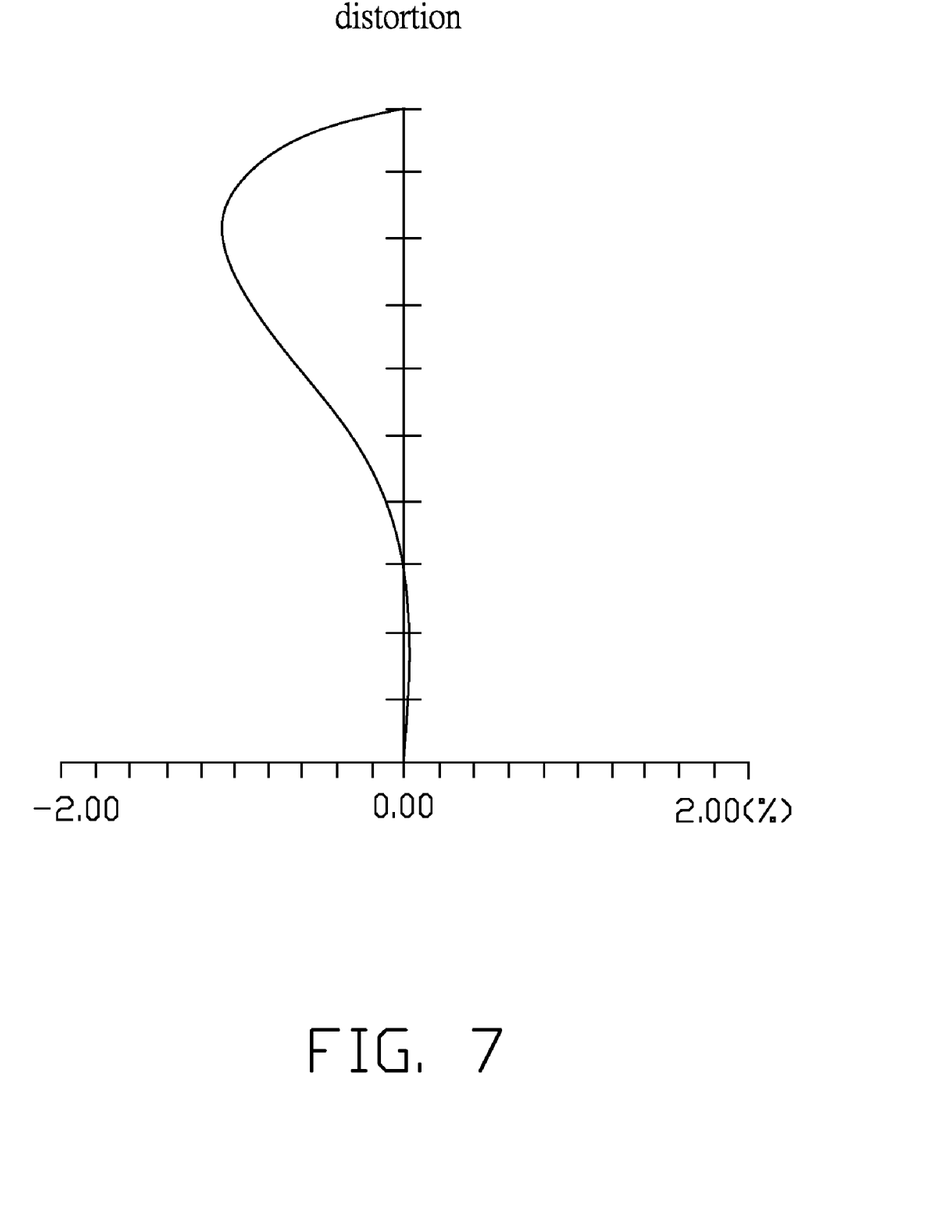
FIG. 7 is a distortion graph of the imaging module of FIG. 1, according to the second exemplary embodiment.

The spherical aberration graph, the field curvature graph, and the distortion graph of the image module 100 of Example 2 are respectively shown in FIGS. 5~7. Spherical aberrations of line f (λ=486 nm) and line d (λ=587 nm) and line c (λ=656 nm) are shown in FIG. 5. Generally, spherical aberration of visible light (with a wavelength between 400~700 nm) of the image module 100 in the Example 1 is within a range of −0.05 mm to 0.05 mm. The sagittal field curvature and tangential field curvature shown in FIG. 6 are kept within a range of −0.10 mm to 0.10 mm. The distortion in FIG. 7 falls within a range of −2% to 2%. Obviously, the spherical aberration, field curvature, and distortion are well controlled in the Example 2 of the image module 100.

In summary, according to examples 1-2, though the overall length of the imaging module 100 is reduced, aberrations are controlled/corrected within an acceptable range.

It will be understood that the above particular embodiments and methods are shown and described by way of illustration only. The principles and the features of the disclosure may be employed in various and numerous embodiment thereof without departing from the scope of the invention as claimed. The above-described embodiments illustrate the scope of the invention but do not restrict the scope of the invention.

What is claimed is:

1. An imaging module comprising,
an imaging lens system comprising, in the order from the object side to the image side thereof, a first lens of positive refraction power, a second lens of negative refraction power, a third lens of positive refraction power; and a fourth lens of negative refraction power, and
an image sensor aligned with the imaging lens system and placed at the image side of the imaging lens system,
wherein the imaging module satisfies the formulas:

$2.4 < F1/TTL < 3.0$, $-7.0 < F2/TTL < -5.5$, $0.95 < F3/TTL < 2.0$, and $-3.5 < F4/TTL < -2.5$, wherein TTL is the distance from the object surface of the first lens to the sensing surface of the image sensor on the optical axis of the imaging lens system, F1 is the focal length of the first lens, F2 is the focal length of the second lens, F3 is the focal length of the third lens, and F4 is the focal length of the fourth lens.

2. The imaging module as claimed in claim 1, wherein the imaging module further satisfies the formula:

$-0.5 < R2/R1 < 0.5$,

Wherein R1 is the radius of curvature of the object surface of the first lens, R2 is the radius of curvature of the second surface.

3. The imaging module as claimed in claim 1, wherein the imaging module further satisfies the formulas:

$1.7 < EFL/F1 < 2.0$, $-1.85 < EFL/F2 < -1.5$, $1.7 < EFL/F3 < 2.0$, and $-0.4 < EFL/F4 < -0.2$, wherein EFL is the effective focal length of the imaging lens system.

4. The imaging module as claimed in claim 1, wherein the imaging module further satisfies the formulas:

$1.6 < Nd2 < 1.8$, and $Vd2 < 30$, wherein Nd2 is the index of refraction of the second lens, the Vd2 is the Abbe number of the second lens.

5. The imaging module as claimed in claim 1, wherein the imaging module further satisfies the formula:

$T2 < 2.5$ mm, wherein T2 is the distance from the image surface of the second lens to the object surface of the third lens on the optical axis of the imaging lens system.

6. The imaging module as claimed in claim 1, wherein the first lens is spherical lens, the second, third and fourth lenses are aspherical lenses.

7. The imaging module as claimed in claim 1, wherein the imaging module further comprises an aperture stop disposed at the object side of the first lens.

8. The imaging module as claimed in claim 1, wherein a cover glass is positioned between the image lens system and the image sensor for protecting a sensing area of the image sensor.

9. The imaging module as claimed in claim 1, wherein the first lens is made of glass, the second and third lenses are made of plastic.

10. An imaging lens system comprising, in this order from the object side to the image side thereof,
a first lens of positive refraction power, a second lens of negative refraction power, a third lens of positive refraction power; and a fourth lens of negative refraction power, and
wherein the imaging lens system satisfying the formulas:

$2.4 < F1/TTL < 3.0$, $-7.0 < F2/TTL < -5.5$, $0.95 < F3/TTL < 2.0$, and $-3.5 < F4/TTL < -2.5$, wherein TTL is the distance from the object surface of the first lens to a sensing surface of an image sensor on the optical axis of the imaging lens system, F1 is the focal length of the first lens, F2 is the focal length of the second lens, F3 is the focal length of the third lens, and F4 is the focal length of the fourth lens.

11. The imaging lens system as claimed in claim 10, wherein the imaging lens system further satisfies the formula:

$-0.5<R2/R1<0.5$,

Wherein R1 is the radius of curvature of the object surface of the first lens, R2 is the radius of curvature of the second surface.

12. The imaging lens system as claimed in claim 10, wherein the imaging lens system further satisfies the formulas:

$1.7<EFL/F1<2.0$, $-1.85<EFL/F2<-1.5$, $1.7<EFL/F3<2.0$, and $-0.4<EFL/F4<-0.2$, wherein EFL is the effective focal length of the imaging lens system.

13. The imaging lens system as claimed in claim 10, wherein the imaging lens system further satisfies the formulas:

$1.6<Nd2<1.8$, and $Vd2<30$, wherein Nd2 is the index of refraction of the second lens, the Vd2 is the Abbe number of the second lens.

14. The imaging lens system as claimed in claim 10, wherein the imaging lens system further satisfies the formula:

$T2<2.5$ mm, wherein T2 is the distance from the image surface of the second lens to the object surface of the third lens on the optical axis of the imaging lens system.

15. The imaging lens system as claimed in claim 10, wherein the first lens is spherical lens, the second, third and fourth lenses are aspherical lenses.

16. The imaging lens system as claimed in claim 10, wherein the imaging lens system further comprises an aperture stop disposed at the object side of the first lens.

17. The imaging lens system as claimed in claim 10, wherein the first lens is made of glass, the second and third lenses are made of plastic.

* * * * *